United States Patent [19]

Backhouse et al.

[11] Patent Number: 4,621,112

[45] Date of Patent: Nov. 4, 1986

[54] WATER-BORN COATING COMPOSITIONS COMPRISING METALLIC POWDER OR FLAKE PIGMENTS

[75] Inventors: Alan J. Backhouse, South Ascot; Andrew Frangou, Surrey; Stephen J. Thorne, Berkshire, all of England

[73] Assignee: Imperial Chemical Industries PLC, London, England

[21] Appl. No.: 759,239

[22] Filed: Jul. 26, 1985

[30] Foreign Application Priority Data

Aug. 2, 1984 [GB] United Kingdom ............... 8419719

[51] Int. Cl.$^4$ .................. B05D 1/36; B05D 5/06; C09D 5/02; C09D 5/38
[52] U.S. Cl. ............................ 524/145; 106/290; 106/308 Q; 427/401; 427/407.1; 524/437
[58] Field of Search .................. 106/290, 308 Q; 524/145, 437; 427/401, 407.1

[56] References Cited

U.S. PATENT DOCUMENTS

| 4,059,550 | 11/1977 | Shimp ............................ 523/404 |
| 4,220,679 | 9/1980 | Backhouse ...................... 427/401 |
| 4,280,960 | 7/1981 | Nonn et al. .................... 106/308 Q |
| 4,289,812 | 9/1981 | Martin ............................ 523/404 |
| 4,350,535 | 9/1982 | Ishijima et al. ............... 106/308 Q |
| 4,565,716 | 1/1986 | Williams et al. .............. 106/308 Q |

FOREIGN PATENT DOCUMENTS

| 58-225174 | 12/1983 | Japan ............................ 524/145 |
| 2043092 | 10/1980 | United Kingdom . |
| 2073609 | 10/1981 | United Kingdom . |

*Primary Examiner*—Ronald W. Griffin
*Attorney, Agent, or Firm*—Cushman, Darby & Cushman

[57] ABSTRACT

The tendency of metallic pigments, especially of aluminum flake pigments, to react with the aqueous medium of a water-born paint composition with the generation of gaseous material is prevented or reduced by incorporating in the composition an agent containing in the molecule at least one P—OH group, or a salt derivative thereof, which is obtained by reacting a compound containing the grouping —O—PO(OH)$_2$ with one or more epoxide group-containing compounds at least one of which also contains at least one aromatic or alicyclic group.

14 Claims, No Drawings

WATER-BORN COATING COMPOSITIONS COMPRISING METALLIC POWDER OR FLAKE PIGMENTS

This invention relates to water-borne coating compositions containing metallic powder or flake pigments, more particularly to such compositions which incorporate an agent whereby the tendency of such pigments to react with the aqueous phase of the compositions, with an accompanying evolution of gas, may be prevented or reduced.

It is well known to incorporate metallic pigments in coating compositions; in particular it is established practice to use aluminium flake pigments in compositions intended for the production of the so-called "glamour" finishes upon automobile bodies, whereby a differential light reflection effect, depending on the angle at which the coated surface is viewed, is achieved. Initially, such coating compositions were solvent-borne, in common with the other coating compositions employed in the automobile industry, but in recent years, owing to the increasing demands for reduction of atmospheric pollution by industrial operations, a move towards water-borne compositions has taken place. There is, for instance, described in British Patent Specification No. 2 073 609A a coating process in which there is first applied to a substrate surface a specified type of water-borne basecoat composition containing pigment, especially aluminium flake pigment, after which there is applied to the resulting basecoat a transparent topcoat composition. Difficulties are, however, encountered in incorporating metallic pigments, in particular those of aluminium or aluminium alloys, into water-borne coating compositions, arising from the tendency of the pigment to react with the water present with resulting evolution of hydrogen. This leads to problems, especially if storing the compositions in closed containers.

Various ways have been proposed in which this "gassing" effect could be minimised or prevented, most of which involve some form of chemical treatment of the metallic pigment to render it less reactive towards the aqueous medium of the coating composition. It is known that orthophosphoric acid is effective for this purpose, but its presence in coating compositions leads to unacceptably poor humidity resistance in films derived from them. Alkyl esters of phosphoric acid overcome this problem to a limited extent, but their use involves an unsatisfactory compromise between the inhibition of gassing and a tendency towards deteriorating mechanical properties of the derived coatings, in particular impaired intercoat adhesion between a basecoat film in which such an agent is present and a superimposed transparent topcoat film. The same is true of non-phosphorus-containing treatment agents, such as the dimer acids which are proposed to be used for this purpose in British Patent Specification No. 2 043 092A.

It has now been found that a satisfactory degree of suppression of the tendency for a metallic pigment to "gas" on storage in a water-borne coating composition can be achieved, without any deleterious effect upon the properties of a coating prepared from the composition, if the pigment is treated with one of a defined class of organic esters of phosphoric acid.

According to the present invention there is provided a water-borne coating composition comprising a film-forming polymer, a metallic pigment and an aqueous diluent medium, wherein the tendency of the pigment to react with the aqueous medium and release gaseous material is prevented or reduced by the incorporation in the composition of an agent which contains in the molecule at least one acidic hydroxyl group linked to a phosphorus atom, or a salt derivative thereof, and which is the reaction product of (i) a compound containing in the molecule the grouping

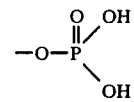

with (ii) one or more compounds which contain in the molecule at least one epoxide group and at least one of which also contains in the molecule at least one aromatic or alicyclic group, provided that, if the compound (i), or one of the compounds (ii), or both, contain an aliphatic group of more than 6 carbon atoms, the total proportion of such aliphatic groups in the reaction product does not exceed 65% by weight.

Phosphorus compounds containing the above-defined grouping which are suitable as the reactants (i) include orthophosphoric acid and monoesters of orthophosphoric acid of the formula

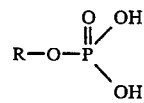

where R is hydrogen or an alkyl, alkoxyalkyl, aryl, alkyl-substituted aryl, cycloalkyl or heterocyclic group. Examples of suitable monoesters of phosphoric acid include monobutyl phosphate, monoamyl phosphate, monononyl phosphate, monocetyl phosphate, monophenyl phosphate and monobenzyl phosphate. Where orthophosphoric acid is used as the reactant (i), it is preferred to employ the 100% acid rather than the commercially available acid of about 83% strength, since the water present in the latter competes for the available epoxide groups and results in the reaction product containing appreciable proportions of free phosphoric acid, with some detriment to its efficiency as a gassing inhibitor.

Compounds containing in the molecule at least one aromatic or alicyclic ring and at least one epoxide group which are suitable as the reactant (ii) in preparing the agents used according to the invention may be of various types. The compounds may, for example, contain in the molecule just one of each of the specified structural features. One such type comprises the glycidyl ethers of monohydric phenols, such as phenyl glycidyl ether, α-naphthylglycidyl ether, β-naphthylglycidyl ether and the corresponding compounds bearing an alkyl substituent of not more than six carbon atoms on the aromatic ring. Also suitable are the glycidyl ethers of aromatic alcohols, e.g. benzyl glycidyl ether. Another suitable type comprises the glycidyl esters of aromatic monocarboxylic acids, such as glycidyl benzoate, glycidyl naphthoate and the glycidyl esters of substituted benzoic acid and naphthoic acids. The alicyclic compounds corresponding to the foregoing, i.e. the corresponding cycloalkyl or bicycloalkyl compounds, may also be used. Another suitable alicyclic compound is cyclohexene oxide.

Alternatively, the reactant (ii) may be a compound containing two or more aromatic or alicyclic rings and/or two or more epoxide groups. Typical of such compounds are the epoxy resins, that is to say the glycidyl polyethers of polyhydric phenols or hydrogenated phenols. Of particular interest are those obtained by the reaction of epichlorhydrin with bisphenol-A, having essentially the general formula

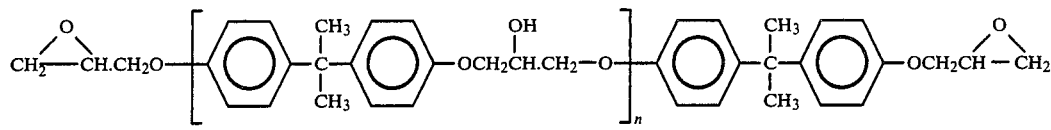

or

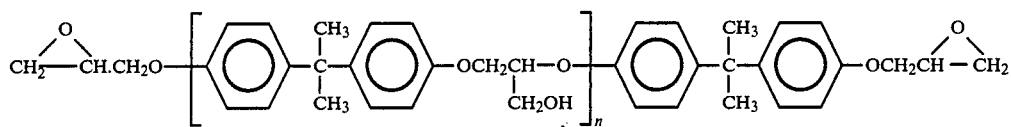

where n may be zero or an integer from 1 to 20. The hydrogenated analogues of the above adducts are also suitable. Many epoxy resins are, of course, commercially available and suitable examples of these include "Epikote" 828, "Epikote" 1001 and "Epikote" 1004, marketed by Shell Chemicals, and similar resins of the "Araldite" series marketed by Ciba-Geigy ("Epikote" and "Araldite" are Registered Trade Marks).

Other suitable reactants (ii) containing two or more aromatic or alicyclic rings and two or more epoxide groups are addition copolymers derived from at least one monomer containing an aromatic or alicyclic ring and at least one monomer containing an epoxide group. As examples of such monomers of the first type there may be mentioned styrene, vinyl toluene, α-methylstyrene.

As examples of such monomers of the second type there may be mentioned glycidyl acrylate, glycidyl methacrylate, allyl glycidyl ether.

As an example of a suitable copolymer there may be mentioned a copolymer of styrene and glycidyl methacrylate.

The gassing-inhibiting agent which is incorporrated in the coating composition may, as already indicated, be derived from a single reactant (ii) or from a mixture of two or more such reactants. In the latter case, whilst at least one of the reactants (ii) must contain in the molecule at least one aromatic or alicyclic group, it is possible for another of the reactants (ii) to contain, instead of an aromatic or alicyclic group, an aliphatic group, provided that, as already defined, the relative proportions of these two types of reactant (ii) are so chosen that the proportion of aliphatic groups containing more than 6 carbon atoms in the final product, including any such groups introduced from the reactant (i) where the radical R is of this nature, does not exceed 65% by weight. Preferably the proportion of such groups does not exceed 55% by weight. Examples of epoxy compounds containing such aliphatic groups include the glycidyl ester of a $C_{9-11}$ tertiary aliphatic carboxylic acid available commercially under the name "Cardura" E ("Cardura" is a Registered Trade Mark of Shell Chemicals) and the products known as Epoxide No. 7 and Epoxide No. 8, marketed by Proctor and Gamble Limited, which are believed to be alkyl glycidyl ethers in which the alkyl groups contain from 8 to 10 carbon atoms and from 12 to 14 carbon atoms respectively.

The relative proportions in which the compounds (i) and (ii) may be reacted together in order to form the agents used according to the invention may vary widely. In the case of a monofunctional reactant (ii), i.e. one containing in the molecule a single epoxy group, this may be used in a proportion of n mols per mol of the reactant (i), where n is the number of replaceable hydrogen atoms in the reactant (i) reduced by one; this is in order to allow for the retention of one free p-OH group in the reaction product. Thus, for example, 1 mol of monobutyl phosphate may be reacted with 1 mol of phenylglycidyl ether. Where the reactant (i) is orthophosphoric acid, the proportions may be such that only one, or at most, two, out of the three replaceable hydrogen atoms react. In the case of a polyfunctional reactant (ii), i.e. one containing more than one epoxy group in the molecule, together with a reactant (i) containing more than one replaceable hydrogen atom, the resulting agents may be polymeric in nature, their molecular weight being dependent upon the precise relative proportions employed. When, in this case, the reactant (i) is orthophosphoric acid, there is a risk of producing unusable gelled reaction products and it is then preferable to include some of a monofunctional reactant (ii) to act as chain-terminator. Thus there may be used, for example, 2 mols of orthophosphoric acid, 1 mol of an aromatic epoxy resin having two epoxy groups per molecule, and 2 mols of an aromatic or a linear aliphatic monoepoxide. It will be understood, however, that in any case where the reactants are polyfunctional, the product is likely to be a statistical mixture of a number of different molecular species.

The reactants (i) and (ii) may be reacted together, if desired, in the presence of a substance known to catalyse the opening of the epoxide ring, for example a base such as triethylamine. An elevated temperature, for example of up to 150° C., may be employed if necessary to ensure that the reaction goes to completion, but the initial stages of the reaction may be quite exothermic and cooling or regulated addition of one reactant to the other may be necessary in order to avoid an excessive rise in temperature. In order to maintain fluidity of the reaction mixture, especially where the reactant (ii) is a relatively high-melting solid, it may be advantageous to carry out the reaction in an inert, polar diluent or solvent, such as dioxane or tetrahydrofuran. In these circumstances, the reaction is conveniently carried out at the temperature of reflux of the diluent, e.g. in the range 60°–110° C.

The immediate product of the reaction together of the reactants (i) and (ii), containing free P-OH groups and having a positive acid value, may if desired be used directly as the inhibiting agent in the compositions of the invention, but more usually it will be employed in salt form, obtained by neutralising the reaction product with ammonia or an amine such as triethylamine. The deciding factor in this respect is the degree of stability of the other constituents of the coating composition, in particular that of the film-forming polymer, towards the addition of materials of low pH. For example, where the film-forming material is an addition polymer containing carboxylic acid groups which is rendered soluble or dispersible in water by neutralisation of those groups with an amine, the addition of the unneutralised inhibiting agent would be likely to cause precipitation of the polymer.

The metallic pigment which is present in a waterborne coating composition according to the invention may be any of those which are well known to be used for that purpose; these include in particular pigments composed of aluminium, copper, zinc and brass, but those composed of other malleable metals and alloys such as nickel, aluminium-copper alloy, aluminium-zinc alloy, aluminium-nickel alloy and aluminium-magnesium alloy are also suitable. The invention is of especial interest in the case of metallic flake pigments intended for incorporation into water-borne coating compositions, of which aluminium flake is the most commonly encountered example. The metallic flakes typically have a thickness in the range 0.01–5 μm and a length or width in the range 1–50 μm. Various procedures may be followed for introducing the inhibiting agents into the compositions of the invention. One suitable method is to bring the metallic pigment into contact with the agent prior to the incorporation of the pigment into the water-borne coating composition. This may be done by adding the agent to the pigment paste as this is normally supplied commercially, but the agent may be added at an even earlier stage, namely during the actual production of the pigment; for example it may be done between the steps of hammer-milling and reincorporation into white spirit or other organic medium in the case of aluminium flake pigment. However, it has been found that, in the majority of cases, the full effect of the agent is achieved if the agent is simply introduced as a further ingredient in the formulation of the water-borne coating composition, i.e. during the blending of film-forming resin, metallic pigment and aqueous medium together with other conventional and optional constituents such as crosslinking agents, co-solvents, thickeners and fillers. Preferably the agent is added after some initial dispersion and de-agglomeration of the metallic pigment in the aqueous medium has taken place.

Irrespective of the manner in which the inhibiting agent is introduced, satisfactory results are obtained when there is used an amount of the agent which, on the basis of its acid value as determined by titration with potassium hydroxide to a phenolphthalein end point, is equivalent to from 0.2% to 5%, preferably from 0.5% to 2%, of orthophosphoric acid, based upon the weight of metallic pigment present. Thus the actual amount of agent required will be adjusted according to its molecular weight.

In the coating compositions of the invention, the recognised phenomenon of "gassing" in water-borne coating compositions containing metallic pigments is extensively suppressed or eliminated, at the same time any adverse effects upon the properties of coatings derived from the compositions being minimised or avoided. One such adverse effect which may be mentioned, and which is commonly encountered in the use of the inhibiting agent of the prior art referred to above, is a reduction in the mechanical strength of the coating film, which manifests itself in poor resistance to impact, for example by flying stones in the case of coated automobile bodies. Where a composition containing a relatively high concentration of metallic flake pigment is used to produce a basecoat over which a transparent topcoat composition is then applied—again mainly in the painting of automobiles—the prior art inhibitors may cause an impaired adhesion between the two coatings in the finished product. Such defects as these are commonly encountered in the use of the gassing inhibitors of the prior art referred to above, but are minimised or avoided by means of the present invention. Another disadvantage frequently met with is a reduction in the humidity resistance of a coating, due to the presence of the inhibiting agent: this is particularly pronounced when orthophosphoric acid is employed as the agent. The agents used according to the invention enable effective inhibition of gassing to be achieved without incurring the penalty of these disadvantages.

The coating compositions of the invention may contain, as the film-forming polymer constituent, any of the materials which are commonly employed for that purpose in water-borne compositions. Thus there may be used as already mentioned, addition polymers of the acrylic type which are either dispersed or dissolved in the aqueous phase of the composition, the polymers in some cases being solubilised by the neutralisation with ammonia or an amine of carboxylic acid groups which they contain. Alternatively, the film-forming polymer may be a condensation polymer such as a polyester or an alkyd resin, here again solubilisation in the aqueous medium being achieved by the neutralisation of acid groups present.

The coating compositions may also contain other conventional paint additives which are soluble or dispersible in water, such as non-metallic coloured pigments and thickeners.

The invention is illustrated by the following Examples, in which parts and percentages are by weight.

EXAMPLE 1

A. Preparation of Inhibiting Agent

A mixture of epoxy resin ("Epikote" 828; 42.03 parts, 0.5 mole) and phenyl glycidyl ether (33.18 parts, 1 mole) was added with stirring over a period of about 1 hour to 88% orthophosphoric acid (24.63 parts, 1 mole) containing triethylamine (0.16 part). The temperature was allowed to rise as a result of the exotherm, a maximum of about 120° C. being attained. When the addition was complete, the reaction mixture was heated with stirring at 110°–120° C. for 2 hours to ensure complete reaction. The product was a brown, viscous liquid of acid value 124.1 mg KOH/g (non-volatile) which on cooling to room temperature became a very hard solid. To facilitate its handling, the material was diluted and neutralised as follows.

The molten reaction product (17.00 parts) was added with stirring to 2-butoxyethanol (41.72 parts), followed by triethylamine (3.46 parts) and demineralised water (36.31 parts). The pH of the resulting solution was measured and further small additions of triethylamine and demineralised water were made to bring the pH to 7.6.

B. Preparation of Paint Composition

The following ingredients were blended together:

| | |
|---|---|
| Aluminum flake pigment, 65% paste | 30.97 parts |
| 2-Butoxyethanol | 55.57 parts |
| Low mol.wt. melamine/formaldehyde resin ("Cymel" 325)* | 27.87 parts |
| Polypropylene glycol, mol.wt. 440 | 14.86 parts |
| Triethylamine, 5% aqueous solution. | 24.77 parts |

*"Cymel" is a Registered Trade Mark.

The blend was stirred until the aluminium flake pigment was fully and uniformly dispersed. There was then added dropwise to the blend the neutralised solution of inhibiting agent prepared according to part (A) above (13.90 parts), followed by 466.4 parts of an aqueous latex, of solids content 18%, of an acrylic resin of acid value 25 mg KOH/g neutralised with triethylamine.

To the resulting mixture were finally added, in the following order, 5% triethylamine (4.72 parts), demineralised water (266.60 parts), 2-butoxyethanol (3.34 parts) and further demineralised water (20.54 parts). The paint composition thus obtained had a solids content of 16.0%, a co-solvent content of 14.0% and a pH value of 7.6. After storage for 2 weeks at 40° C., the paint was found to have evolved 6.2 mls of gas per 100 g of paint; there was no change in the appearance of the aluminium flake pigment. A sample of the same paint composition from which the inhibiting agent had been omitted gassed violently at 40° C. and the aluminium flake was rapidly and completely converted to the oxide.

EXAMPLE 2

A. Preparation of Inhibitinq Agent

To a stirred reaction vessel fitted with thermometer and reflux condenser were added:

| | |
|---|---|
| Phosphoric acid* | 42.1 parts |
| Tetrahydrofuran | 159.0 parts |

*This material was a mixture of orthophosphoric acid, pyrophosphoric acid and water, equivalent to 100% orthophosphoric acid.

This material was a mixture of orthophosphoric acid, pyrophosphoric acid and water, equivalent to 100% orthophosphoric acid.

The above mixture was heated to reflux temperature (67° C.) and there was then added, at a constant rate over 1½ hours, the following:

| | |
|---|---|
| Epoxy resin ("Epikote" 1001) dissolved in | 193.5 parts |
| Phenyl glycidyl ether and | 64.5 parts |
| Tetrahydrofuran | 50.0 parts |

When the addition was complete, the reaction mixture was held at reflux temperature (71° C.) for a further one hour, then cooled. The resulting solution of phosphate esters had an acid value of 89.4 mg KOH/g (nonvolatile) (titration with KOH-phenolphthalein) and a zero epoxide value. The product was neutralised by blending together the above solution (161.9 parts), 2-butoxyethanol (190.4 parts), triethylamine (15.6 parts) and demineralised water (232.1 parts). The resulting aqueous solution had a solids content of 17.3% and a pH of 7.6.

B. Preparation of Paint Composition

The procedure described in Example 1(B) was repeated, except that, in place of the 13.9 parts of inhibiting agent solution used therein, there were substituted 19.3 parts of the solution prepared as described in part (A) above.

After storage for 2 weeks at 40° C., the paint was found to have evolved 4.2 mls of gas per 100 g of paint, with no apparent change in the aluminium flake pigment. A sample of the same paint composition from which the inhibiting agent had been omitted gassed violently under the same conditions and the aluminium flake was completely converted to the oxide.

EXAMPLE 3

A. Preparation of Inhibiting Agent

The procedure described in Example 2(A) was repeated, except that the materials and quantities used were altered as follows:

| | |
|---|---|
| Phosphoric acid (as in Example 2(A).) | 54.5 parts |
| Tetrahydrofuran | 211.6 parts |
| Epoxy resin ("Epikote" 828) dissolved in | 105.6 parts |
| Epoxy ether of $C_{12-14}$ hydrocarbons ("Epoxide" No. 8.) | 159.7 parts |

The solution of phosphate esters obtained had an acid value of 101.0 mg KOH/g and a zero epoxide value. The product was neutralised by blending together the above solution (109.7 parts), 2-butoxyethanol (182.6 parts), triethylamine (22.1 parts) and demineralised water (225.6 parts). The resulting aqueous solution had a solids content of 19.6% and a pH of 7.6.

B. Preparation of Paint Composition

The procedure described in Example 1(B) was repeated, except that, in place of the 13.9 parts of inhibiting agent solution used therein, there were substituted 17.1 parts of the solution prepared as described in part (A) above. After storage for 2 weeks at 40° C, the paint was found to have evolved 5.5 mls of gas per 100 g of paint, with no apparent change in the aluminium flake. The same paint composition from which the inhibiting agent had been omitted gassed violently under the same conditions and the aluminium flake was completely converted to the oxide.

EXAMPLE 4

A. Preparation of Inhibiting Agent

The procedure described in Example 2(A) was repeated, except that the materials and quantities used were altered as follows:

| | |
|---|---|
| Phosphoric acid (as in Example 2(A).) | 22.3 parts |
| Tetrahydrofuran | 113.9 parts |
| Epoxy resin ("Epikote" 1004) dissolved in | 215.7 parts |
| Phenylglycidyl ether and | 34.2 parts |
| Tetrahydrofuran | 113.9 parts |

The solution of phosphate esters obtained had an acid value of 51.7 mg KOH/g and an epoxide value of 9.3. The product was neutralised by blending together the above solution (144.5 parts), 2-butoxyethanol (149.0 parts), triethylamine (7.5 parts) and demineralised water (199.0 parts). The resulting aqueous solution had a solids content of 16.8% and a pH of 7.6.

B. Preparation of Paint Composition

The procedure described in Example 1(B) was repeated, except that, in place of the 13.9 parts of inhibiting agent used therein, there were substituted 19.6 parts of the solution prepared as described in part (A) above.

After 2 weeks' storage at 40 C, the paint was found to have evolved 4.5 mls of gas per 100 g of paint, with no apparent change in the aluminium flake. The same paint composition from which the inhibiting agent had been omitted gassed violently under the same conditions and the aluminium flake was completely converted to the oxide.

EXAMPLE 5

A. Preparation of Comparative Paint Composition

A paint composition was prepared as described in Example 1(B), except that the inhibiting agent used therein was replaced by a solution of a mixture of mono- and di-cetyl acid phosphates, the solution having the same solids content, pH, 2-butoxyethanol content and water content as the original material.

B. Testing of Paint Composition

The paint prepared as described in part (A) above, and the paints described in parts (B) of Examples 1 to 4 inclusive, were each applied by spray to a steel panel which had previously been coated with surfacer and stoved. The amount of paint applied to each panel was such as to give a final stoved film thickness of 12–15 microns. The paint films were dried by blowing with air and there was then applied to each of them a further coating, of thickness 37–45 microns, of a solvent-borne acrylic thermosetting clearcoat. After a 2-minute flash-off at ambient temperature, the panels were stoved at 130° C. for 30 minutes.

When cool, the panels were all submitted to the chip resistance test (ASTM D 3170); according to this test method, the results are graded on a scale of from 1 to 7 in respect of (decreasing) numbers of points in a given panel area at which paint was removed, and also on a scale of from A to D in respect of (increasing) size of the chips of paint removed. The panel coated with the paint of part (A) above was rated 1D after completion of the test, whereas the panels coated with the paint from Examples 1 to 4 were all rated 5A. Thus the panels coated with compositions according to the invention showed considerable superiority in chip resistance over the panel coated with the comparative composition.

EXAMPLE 6

A. Preparation of Inhibiting Agent (i) To a reactor fitted with reflux condenser there was charged $C_9/C_{10}$ aromatic hydrocarbon, boiling range 187°–210° C., (29.2 parts). This was raised to reflux temperature and to it were added, over a period of 3 hours, a mixture of styrene (42.0 parts) and glycidyl methacrylate (18.0 parts), together with 1,2-di-(tert-butylperoxy)-3,3,5-trimethylcyclohexane (50% solution in dibutyl phthalate, 5.4 parts) and primary octyl mercaptan (5.4 parts). When the addition was complete, the polymerisation mixture was held at reflux temperature for a further 3 hours, then cooled.

(ii) 100% phosphoric acid (6.79 parts) was dissolved in xylene (32.87 parts) and the solution heated to 80° C. To this was added, over a period of 1.5 hours whilst maintaining the same temperature, a mixture of phenylglycidyl ether (10.40 parts) and the solution of polymer obtained in step (i) above (49.94 parts). The temperature of the reaction mixture was thereafter kept at 80° C. for 2 hours more. The mixture was then cooled to give a solution of phosphate esters having an acid value of 95 mg KOH/g.

(iii) The product was neutralised by blending together the above solution (65.15 parts), 2-butoxyethanol (30.62 parts) and triethylamine (4.23 parts).

B. Preparation of Paint Composition

The procedure described in Example 1(B) was repeated, except that, in place of the inhibiting agent used therein, there was used 12.80 parts of the neutralised solution obtained in part A(iii) above.

After storage for 2 weeks at 40° C., the paint was found to have evolved 3.8 mls of gas per 100 g of paint, with no apparent change in the aluminium flake pigment.

The paint was applied to a panel and tested as described in part B of Example 5. The rating found was 5A.

We claim:

1. A water-borne coating composition comprising a film-forming polymer, a metallic pigment and an aqueous diluent medium, wherein the tendency of the pigment to react with the aqueous medium and release gaseous material is prevented or reduced by the incorporation in the composition of an agent which contains in the molecule at least one acidic hydroxyl group linked to a phosphorus atom, or a salt derivative thereof, and which is the reaction product of (i) a compound containing in the molecule the grouping

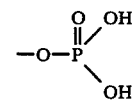

with (ii) one or more compounds which contain in the molecule at least one epoxide group and at least one of which also contains in the molecule at least one aromatic or alicyclic group, provided that, if the component (i) or one of the compounds (ii), or both, contain an aliphatic group of more than 6 carbon atoms, the total proportion of such aliphatic groups in the reaction product does not exceed 65% by weight.

2. A composition as claimed in claim 1, wherein the compound (i) is orthophosphoric acid or a monoester thereof, the esterifying group being an alkyl, alkoxyalkyl, aryl, alkyl-substituted aryl, cycloalkyl or heterocyclic group.

3. A composition as claimed in claim 1, wherein the compound (ii) contains a single epoxide group and a single aromatic or alicyclic group.

4. A composition as claimed in claim 3, wherein the compound (ii) is phenylglycidyl ether.

5. A composition as claimed in claim 1, wherein the compound (ii) contains two or more epoxide groups and/or two or more aromatic or alicyclic groups.

6. A composition as claimed in claim 5, wherein the compound (ii) is an epoxy resin obtained by the reaction of epichlorhydrin with bisphenol-A.

7. A composition as claimed in claim 5, wherein the compound (ii) is an addition copolymer derived from at least one monomer containing an aromatic or alicyclic ring and at least one monomer containing an epoxide group.

8. A composition as claimed in claim 1, wherein the reaction between the compounds (i) and (ii) is catalysed by a base.

9. A composition as claimed in claim 1, wherein the metallic pigment is aluminium flake.

10. A composition as claimed in claim 1, wherein the metallic pigment has been contacted with the inhibiting agent prior to incorporation of the pigment into the composition.

11. A composition as claimed in claim 1, wherein the inhibiting agent is introduced during the formulation of the composition.

12. A composition as claimed in claim 1, wherein the inhibiting agent is used in an amount which, on the basis of its acid value, is equivalent to from 0.2% to 5% of orthophosphoric acid.

13. A composition as claimed in claim 12, wherein the inhibiting agent is used in an amount which is equivalent to from 0.5% to 2% of orthophosphoric acid.

14. A process for coating a substrate wherein there is initially applied to the substrate surface a basecoat composition according to claim 1 and there is then applied to the resulting film a transparent topcoat composition.

* * * * *